(12) United States Patent
Heijningen

(10) Patent No.: US 9,193,144 B2
(45) Date of Patent: Nov. 24, 2015

(54) COMPOSITE STENCILS, METHODS OF MAKING, AND METHODS OF DECORATING WITH COMPOSITE STENCILS

(71) Applicant: Procraft Development B.V., Alphen Aan Den Rijn (NL)

(72) Inventor: Dirk Jan van Heijningen, Alphen aan den Rijn (NL)

(73) Assignee: Procraft Development B.V., Alphen aan den Rijn (NL)

(*) Notice: Subject to any disclaimer, the term of this patent is extended or adjusted under 35 U.S.C. 154(b) by 127 days.

(21) Appl. No.: 13/646,749

(22) Filed: Oct. 8, 2012

(65) Prior Publication Data

US 2014/0096905 A1    Apr. 10, 2014
US 2014/0374019 A9    Dec. 25, 2014

Related U.S. Application Data

(62) Division of application No. 12/618,969, filed on Nov. 16, 2009, now abandoned.

(60) Provisional application No. 61/168,352, filed on Apr. 10, 2009.

(51) Int. Cl.
*B32B 37/12* (2006.01)
*B41F 15/34* (2006.01)
*B05C 17/06* (2006.01)

(52) U.S. Cl.
CPC ............. *B41F 15/34* (2013.01); *B05C 17/06* (2013.01); *B32B 37/12* (2013.01); *B32B 37/1284* (2013.01); *B32B 2305/18* (2013.01)

(58) Field of Classification Search
CPC .......... B41C 1/14; B41C 1/147; B41N 1/247; B41N 1/242; B41N 1/24; B41M 1/12; B41M 3/00; B41M 3/12; B41M 3/008; B41M 1/20; G03F 7/12

USPC .................. 156/239, 60, 230, 277, 290, 291; 101/128.4, 27, 128.21, 129, 127, 114

See application file for complete search history.

(56) References Cited

U.S. PATENT DOCUMENTS 1,594,743 A   8/1926   Matthews et al.
1,611,021 A   12/1926  Gestetner
(Continued)

FOREIGN PATENT DOCUMENTS

CA    2088400 A1    1/1994

OTHER PUBLICATIONS

European Search Report completed on Jun. 28, 2011 for EP Application No. 09 17 6112.

*Primary Examiner* — Michael N Orlando
*Assistant Examiner* — Margaret Squalls
(74) *Attorney, Agent, or Firm* — Seed IP Law Group PLLC

(57) ABSTRACT

A composite stencil for applying designs to walls and other surfaces is disclosed. The stencil includes a porous textile support layer to which a flexible stencil mask is bonded by an adhesion layer. The support layer supports unconnected parts of the stencil mask without bridges common with traditional stencils. Further, the textile support layer in the open areas of the stencil can be colored with a sublimation dye to suggest to a user the colors that should be applied in the various areas of the stencil. A pressure sensitive adhesive is applied to the back of the stencil. In use, the stencil is removably adhered to a surface by the pressure sensitive adhesive, whereupon paint or other pigment is applied through the textile support layer to the surface. The lack of bridges permits the entire design to be applied with a single stencil in a single session. The stencil is cleanable and reusable to apply additional designs.

14 Claims, 5 Drawing Sheets

(56) References Cited

U.S. PATENT DOCUMENTS

| | | |
|---|---|---|
| 1,808,986 A | 6/1931 | Hunter |
| 1,954,672 A | 4/1934 | Kavanaugh |
| 2,427,447 A | 9/1947 | Dicks |
| 2,651,871 A | 9/1953 | Lynden |
| 3,724,420 A | 4/1973 | Quinn |
| 3,916,050 A | 10/1975 | Kurhajec |
| 4,268,576 A | 5/1981 | Montmarquet, Jr. |
| 4,286,518 A | 9/1981 | Otthofer, Jr. |
| 5,165,337 A | 11/1992 | Schlundt |
| 6,000,331 A | 12/1999 | Ota |
| 6,035,778 A | 3/2000 | Uchiyama |
| 6,541,561 B1 | 4/2003 | Lythgoe |
| 2001/0000382 A1 | 4/2001 | Simons |
| 2003/0051801 A1 | 3/2003 | Usami et al. |
| 2004/0118305 A1 | 6/2004 | Martinez et al. |
| 2010/0258014 A1* | 10/2010 | van Heijningen .......... 101/128.4 |

* cited by examiner

Temporary filmic release
transfer carrier printed with
flexible stencil mask
Polymer powder adhesion layer
to be applied, sprinkled, or
printed to the flexible
transfer stencil mask

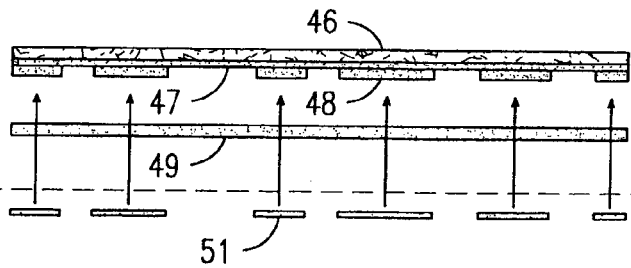

FIG. 7

Preferred glass-fibre PTFE
coated temporary release
transfer carrier

Preferred glass-fibre PTFE
coated temporary release
transfer carrier printed
with flexible stencil mask
Polymer powder adhesion layer
to be applied, sprinked, or
printed to the flexible
transfer stencil mask

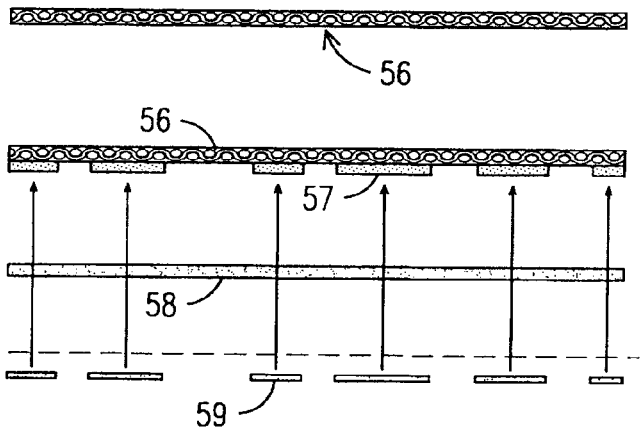

FIG. 8

Textile stencil support
preparation:
textile stencil compressed
stabilized and interlocked

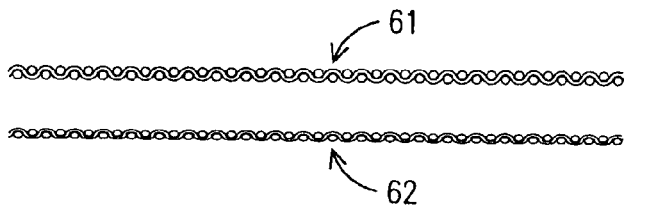

FIG. 9

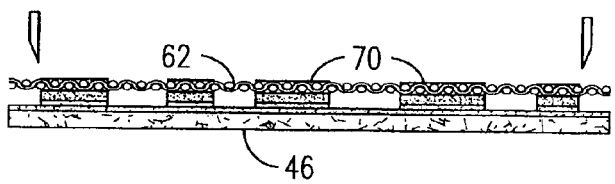

Composite stencil printed on the permanent filmic release carrier fused with the textile support laminated ready to be trimmed, no interleaving material required

FIG. 12

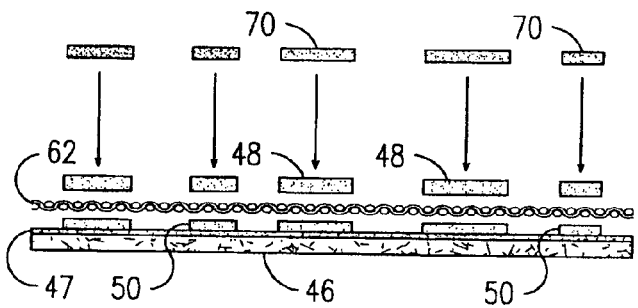

Optional print of the polymer powder on the direct printed stencil mask Flexible transfer stencil mask direct printed on the textile support layer laminated to the printed PSA adhesive on the permanent filmic or paper release carrier

FIG. 13

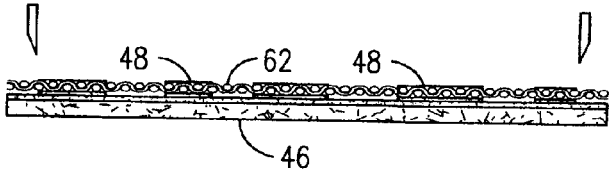

Fused composite stencil direct printed on the textile support layer laminated to the PSA adhesive on a permanent filmic or paper release carrier ready to be trimmed, no interleaving material required

COMPOSITE STENCILS, METHODS OF MAKING, AND METHODS OF DECORATING WITH COMPOSITE STENCILS

REFERENCE TO RELATED APPLICATION

This patent application is a divisional of U.S. patent application Ser. No. 12/618,969, filed Nov. 16, 2009, which application claims priority to the filing date of U.S. provisional patent application No. 61/168,352 filed on Apr. 10, 2009. Each of the foregoing is incorporated herein in its entirety by this reference.

TECHNICAL FIELD

This disclosure relates generally to stencils and to decorating with stencils and more specifically to composite stencils having a backing that supports a stencil mask, and to methods of decorating with composite stencils.

BACKGROUND

Stencils have long been manufactured by expropriated methods such as die-cutting, routing, laser-cutting, engraving, exposing by ultraviolet light, developing, and etching. Some of the earliest stencils used by professional painters were cut out by knife from paperboard or cardboard such as Manila-board impregnated to be oil resistant to a degree, since, at that time, most of the paints used with stencils to illustrate and decorate walls and furniture were oil based. More recently, stencils were die cut from vinyl and polypropylene plastic sheets, which results in stencils that are resistant to water-based acrylic and latex paints. Because of the limitations of die making, routing, cutting, and plotting, the original artwork embodied in the stencil has had to be modified and adapted. For example, sharp corners and small diameter holes were not possible. Because of this inconvenience, the industry more recently has moved to laser-cut stencils, which is an improvement and finer details are achievable. Another group of stencils is stencils formed of copper, messing, or stainless steel that has been chemically etched to form the stencil mask.

The most common drawback of today's stencil technology is the necessity to bridge every non-connected part of the stencil mask to the main body of the stencil material to hold these otherwise free-floating parts in place. This results, however, in a bridged transformation of the original artwork when the stencil is used to apply a design because the bridges mask paint and result in unpainted voids or gaps in what should be painted areas of the design. Typically, this can only be corrected by sequential overlaying use of up to three stencils, with the decorator layering the paint, or other color material in steps to obtain the original design. This is not only cumbersome and time consuming, it often results in a less than pleasing design due to difficulties of overlaying subsequent stencils accurately, matching the paint precisely from layer to layer, and similar problems.

Another drawback of prior art stencil manufacturing is that, since the stencil is formed by a cutting knife, die-cutting, laser-cutting, engraving, routing or some other subtractive technique, the inner parts that are cut away are lost as waste. With stencils created by photographic and etching techniques, excess material that is dissolved or etched away is wasted and needs to be disposed of as does the emulsions and other chemicals used in these techniques. When using electroplating techniques to fabricate stencils, there are subsequent environmental issues arising from the chemicals and metals used in the process. A problem with laser cut stencils is that the laser cutting is usually done from polyester sheets that are relatively thin and thus have limited dimensional stability. Metal etching techniques of forming stencils is a slow process with large environmental drawbacks. Further, it results in stencils that lack transparency and flexibility and therefore that are not particularly useful for artistic decorating with paints and pigments.

It is more and more common that individuals themselves, often referred to as "do-it-yourselfers," carry out many home decorating improvements that involve the use of stencils to apply designs to a surface. To overcome problems associated with the bridges of traditional stencils, U.S. Pat. No. 2,651,871 teaches a method of multiple sequential layering of complementary stencils to reproduce the original art. As mentioned above, this can be cumbersome and can produce unsatisfactory results even for professionals, and these problems are only exacerbated with the less experienced home user. U.S. Pat. No. 3,724,420 teaches, among other improvements, the use of thick stencils with high walls and narrow bridges to allow one to apply paint within the stencil beneath the bridges. A disadvantage of such a stencil, however, is the loss of flexibility for use on irregular walls and textiles. U.S. Pat. No. 4,268,576 teaches the use of a special porous tissue paper to support open or loose parts of the stencil in an attempt to avoid bridges. However the stencil mask material itself in this patent is a photosensitive or ultraviolet curable film that must be developed and/or washed out in areas where paint is to be applied. These methods are less practical to produce efficiently in large numbers, and the mechanical strength and the reusability after reclaiming or cleaning the stencils with water, soap, or solvents is severely limited.

Accordingly, an improved stencil and method of its fabrication is needed that addresses the problems and shortcomings of the prior art, some of which are discussed above. A need also exists for a method of decorating with such stencils that produces better and more consistent images on many surfaces without the need to layer stencils sequentially or to try to match paint layers applied by successive stencils. Finally, a need exists for stencils that are more convenient and instructive for use both by professionals and non-professional individuals or do-it-yourselfers applying decorations in their own homes. It is to the provision of a stencil, stencil fabrication techniques, and stencil uses that address these and other needs that the present invention is primarily directed.

SUMMARY

Briefly described, an improved stencil for applying decorative designs to walls and other surfaces is disclosed. The stencil has a textile stencil support sheet or layer that has been compressed and its fibers fused and interlocked with heat to stabilize the support layer. A stencil mask made of flexible impermeable material is applied to the support layer and is thermally adhered or fused thereto, preferably with a thermal adhesion layer, which can be applied as a powder. The open areas between areas covered by the stencil mask are areas through which paint is to be applied to an underlying surface during use of the stencil. The textile support layer, at least partially because of its fused and interlocked fibers, is relatively robust and supports open or otherwise unconnected portions of the stencil mask in their proper positions within the stencil design. At the same time, the textile material is porous enough to allow paint to be used in the stenciling process to pass through to a surface below. A pressure sensitive adhesive is applied to the back of the stencil within the stencil mask and is protected until use with a protective release layer. Optionally, the textile support layer within the open areas of the stencil mask may be colored with, for example, dye sublimation inks, to correspond to suggested colors to be applied at various locations to obtain a pleasing design. Information or other instructions for use also may be provided within the open areas. Color information and other instructions also may be printed on the closed part of the stencil if desired.

In use, the protective release layer is removed from the back of the stencil and the stencil is placed against a wall or other surface to receive a stenciled design. The pressure sensitive adhesive adheres the stencil to the surface. Paint can then be applied in the open areas between the stencil mask and the paint passes through the textile support layer therein and onto the surface below. If the support layer has been pre-died to suggest coloration, the user may apply colors corresponding to those that appear on the textile support layer between the stencil mask. Because there are no bridges holding floating or unconnected portions of the stencil mask in place, paint can be applied within the entire image with a single stencil and a single painting session without any artifacts in the final design caused by bridges, as has been the case in the past. Further, the painter can apply designs that are more subtle and detailed. After use, the stencil of this disclosure can simply be washed out to remove any remaining paint and can be used over and over to apply multiple copies of the design.

Somewhat more specifically described, an object of this disclosure is a novel and improved method of applying art and decorative designs to a wide range of surfaces using stencils that are relatively inexpensive to manufacture and are reclaimable, easy to clean, reusable, do not have bridges supporting unconnected portions of the stencil mask, and allow for the application of the complete design with a single stencil in a single session. The method of manufacturing the stencil is efficient and respects the environment by producing minimal waste during the production process. The stencil is strong, flexible, and easily cleanable with a minimum use of detergents and other materials. In one embodiment, the stencil is formed by providing a first layer of transfer material printed in the configuration of the stencil mask on a polyester, paper, or reusable glass fiber release coated carrier, the transfer material being configured in a design that is a duplicate of an original work of art. The substantially impermeable film forming transfer material can be formulated from different ink systems such as vinyl inks, acrylic inks, polyurethane inks, polyester inks, and the like. A method of immolating the textile support substrate with the printed image includes a transfer method comprising a reusable flexible carrier printed with a drying or cross-linking ink surface whereby the printed design is not transferable to the textile substrate or receptor material by the application of heat or printing to the printed material alone. Instead, A polymer adhesion layer is applied over the transferable printed design so that the application of heat and high pressure to the transfer sheet causes the polymer layer to melt and merge and form the composite material. The temporary carrier sheet can then be removed leaving the ink design transferred in the configuration of the stencil mask and adhered with the polymer adhesion layer, which is fused with and permanently bonded to the textile stencil support layer. A disposable or temporary paper sheet may be used as the transfer carrier, or a reusable carrier may be used, which may be formed from polyester film, paper, or preferably PTFE coated glass fiber cloth. If a temporary carrier is used, it may be so designed that it can become a part of the product itself and can be used to protect the pressure sensitive adhesive during packing, transport, and after use to maintain tack and insure prolonged reuse. In such a case, there may be no need to apply a silicone protective layer, paper, or film. Reusable carriers will support the transfers until the heat lamination to the textile support layer and can be reused indefinitely. The transfer of the stencil mask is accomplished without pressure sensitive adhesive. Instead, a thermoplastic polymer mixture of dry powders are sprinkled or printed onto the wet or gelled transfer ink film on the transfer carrier. Upon application of the transfer carrier to a textile support sheet under heat and pressure, the powders melt and adhere by bonding and fusing to the textile support sheet and the melting powder permeates the open woven structure of the textile to form the composite stencil configuration. The thermoplastic polymer layer can be mixed with hot-melt particles or separately coated so that a tacky adhesive layer will form under the textile material after processing and heat laminating, to insure the adhesion of the stencil to the decorative background and keep it in place during decoration and or printing.

The composite stencil can be formed with a permanent release carrier that remains with and becomes a part of the product after production. In such a case, a filmic sheet coated with a modified silicone coating is printed with pressure sensitive adhesive and stencil mask material, and is printed or sprinkled with a polymer adhesion layer. The textile sheet is then laminated atop the adhesion layer using heat, which fuses the textile sheet to the stencil mask. The transfer carrier stays with the product in this embodiment and can be removed by a user for decorating with the stencil and replaced after decorating to allow cleaning and to protect the PSA layer after use.

Thus, an improved composite stencil, its method of fabrication, and its use is now provided that successfully address the problems and shortcomings of the prior art. The stencil has no bridges, can be used to apply an entire design with a single stencil, and is fabricated with a minimum of waste and with minimum environmental impact. Coloring suggestions to the user can be provided on the stencil itself, so that the stencil and instructions for use become unified. The stencil is durable, washable, reusable indefinitely, and significantly reduces the complexity of applying designs both for the professional and the amateur. These and other aspects, features, and advantages of the stencil technology disclosed herein will become more apparent upon review of the detailed description set forth below, when taken in conjunction with the accompanying drawing figures, which are briefly described as follows.

BRIEF DESCRIPTION OF THE DRAWINGS

FIG. 7 illustrates an optional process for applying a flexible transfer stencil mask and a pressure sensitive adhesive powder to a filmic release transfer carrier.

FIG. 8 illustrates yet another optional process for applying a flexible transfer stencil mask and an adhesive powder to a glass fiber PTFE coated temporary release transfer carrier.

FIG. 9 illustrates the textile support substrate material before and after being compressed and stabilized.

FIG. 12 illustrates use of the permanent release carrier of FIG. 11 in the formation of a stencil mask according to the invention.

FIG. 13 illustrates the direct printing of the adhesive layer with the laminated textile support sheet with the printed stencil ready to be image fused.

FIG. 14 illustrates a fused composite stencil formed by the process illustrated in FIG. 13 with its permanent protective film or paper release carrier.

DETAILED DESCRIPTION

Stencils and their fabrication and uses will now be described in more detail with reference to the accompanying drawing figures. An overview description will be presented first in order to establish basic principles of the stencil and its use, followed by a more detailed description and examples.

Figure 1:
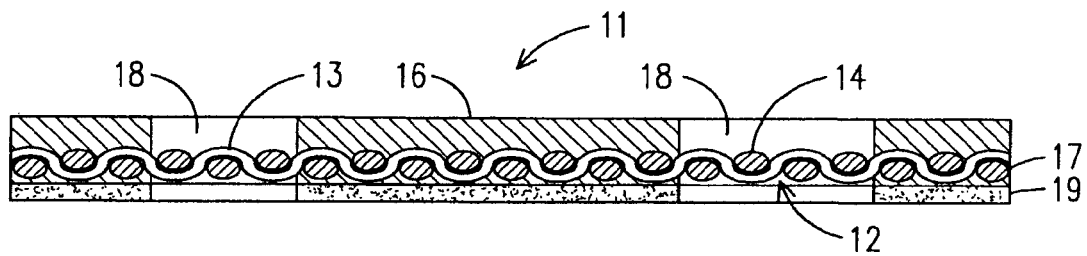
FIG. 1 illustrates a composite stencil according to an embodiment of the invention and having first a film-forming water and solvent resistant transfer layer, and a second layer of thermal forming powder or formulated as a printable thermal ink layer including optional hot melt tack activatable particles.

FIG. 1 illustrates a composite stencil 11 according to principles of this disclosure. The stencil 11 comprises a porous textile support layer 12 made of woven intersecting elements 13 and 14. As detailed below, the support layer 12 has been stabilized by applying heat and pressure to fuse the elements together to form a more rigid and less deformable sheet. A flexible stencil mask 16 is applied to the textile support layer 12 and defines open areas 18 of the stencil through which paint will be applied by an ultimate user to reproduce an image. As described in detail below, the textile support layer within the open areas may be dyed in a sublimation dye process to suggest to a user the colors that should be applied in the various areas of the stencil.

Figure 5:
FIG. 5 illustrates how the adhesive pressure sensitive adhesive layer is protected with a silicone coated paper or foil.

The stencil mask 16 is fused and bonded to the textile support layer by a thermal polymer adhesion layer 17, which is fused both to the flexible stencil mask 16 and fused into the mesh of the textile support layer 12. This not only bonds the stencil mask to the support layer, it also seals the textile support layer in regions of the stencil mask outside the open areas 18. A pressure sensitive adhesive layer 19 is applied to the back of the stencil so that the stencil will adhere to surfaces to which designs are to be applied. Preferably, this layer is made of a material that can be adhered and removed over and over so that the stencil can be moved and reused many times. When not in use, the pressure sensitive adhesive layer is protected by a protective siliconized paper layer 21 (FIG. 5).

It will be appreciated from FIG. 1 that a composite stencil formed according to this disclosure is devoid of any bridges that hold floating or unconnected pieces of the stencil mask in position. Instead, the textile support layer supports and holds all pieces of the stencil mask in their proper positions. Thus, since the paint used with the stencil is applied through the textile support layer, the resulting image also is devoid of gaps that are created with traditional stencils. As a result, the entire image can be applied with a single stencil and in a single session without the need for complementing overlapping sequentially applied stencils. This is not only quicker and less complicated, it results in a better image with finer details and more subtle transitions.

Figure 2:
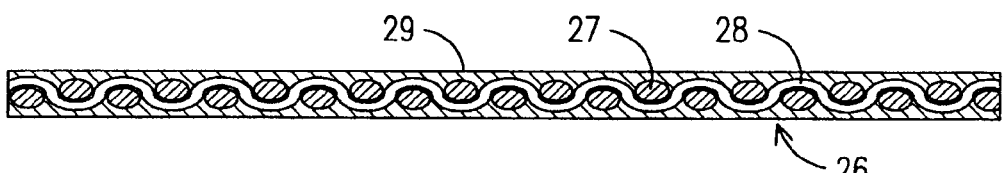
FIG. 2 illustrates a PTFE coated glass fiber release carrier according to the disclosure.

FIG. 2 illustrates a polytetrafluoroethylene (PTFE or Teflon®) coated glass fiber sheet 26 that may be used as a reusable transfer carrier in the process of fabricating composite stencils according to this disclosure. This process is described in detail below; however, the optional PTFE coated glass fiber sheet 26 comprises a glass fiber mat made of woven elements 27 and 28. Alternatively, the mat may be made of a non-woven glass fiber material. In any event, the mat is infused with a coating of PTFE material, which lends strength, provides a release surface, and results in a transfer sheet that is reusable in the process of fabricating composite stencils of this disclosure.

Figure 3:
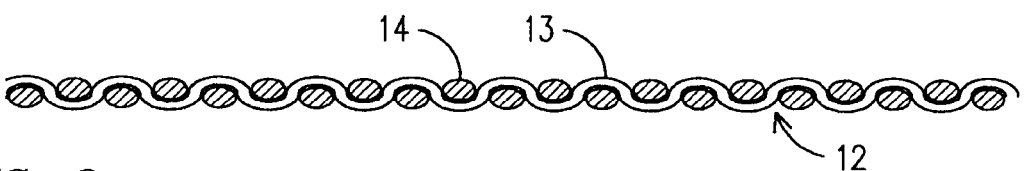
FIG. 3 illustrates woven textile support material, which is pressed and stabilized to form a interwoven stable textile support layer to receive the transferable ink layer with the thermoplastic polymer layer to form a composite stencil.

FIG. 3 illustrates the textile support layer 12 comprising a mesh or mat of woven together textile elements 13 and 14. The porosity of the support layer may vary, but generally is selected so that the particles of pigments within the paints to be used with the stencil will pass through the openings in the woven fabric to be applied to a surface below. In FIG. 3, the textile sheet has been prepared by application of pressure and heat to fuse the elements 13 and 14 together so that the textile sheet is stabilized and forms a more rigid and less deformable support layer in the finished composite stencil.

Figure 4:
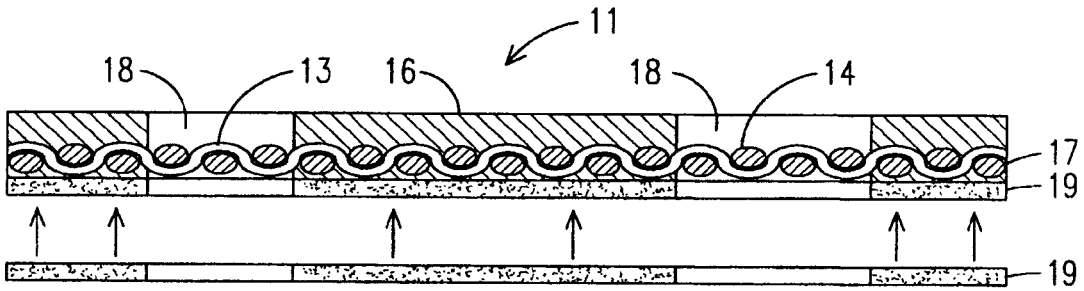
FIG. 4 illustrates the application of a pressure sensitive adhesive backing layer, which may be printed or coated onto the back of the composite stencil.

FIG. 4 illustrates application of the pressure sensitive adhesive layer 19 to the back side of the composite stencil. The adhesive is applied in the same pattern as the stencil mask 16 on the front side of the stencil and may be applied by being printed or otherwise applied to a transfer sheet and pressing the transfer sheet to the back of the stencil with heat. Alternatively, the pressure sensitive adhesive layer 19 may be printed onto the back of the stencil. In any event, a protective sheet 21 (FIG. 5) is applied over the pressure sensitive adhesive to protect the adhesive and to prevent it from drying out between uses of the stencil. The protective sheet 21 may be made of a siliconized paper or other appropriate material.

FIGS. 6 through 10 illustrate methods and processes of fabricating composite stencils according to this disclosure. The processes will be described generally here, followed by a detailed description with examples.

Figure 6:
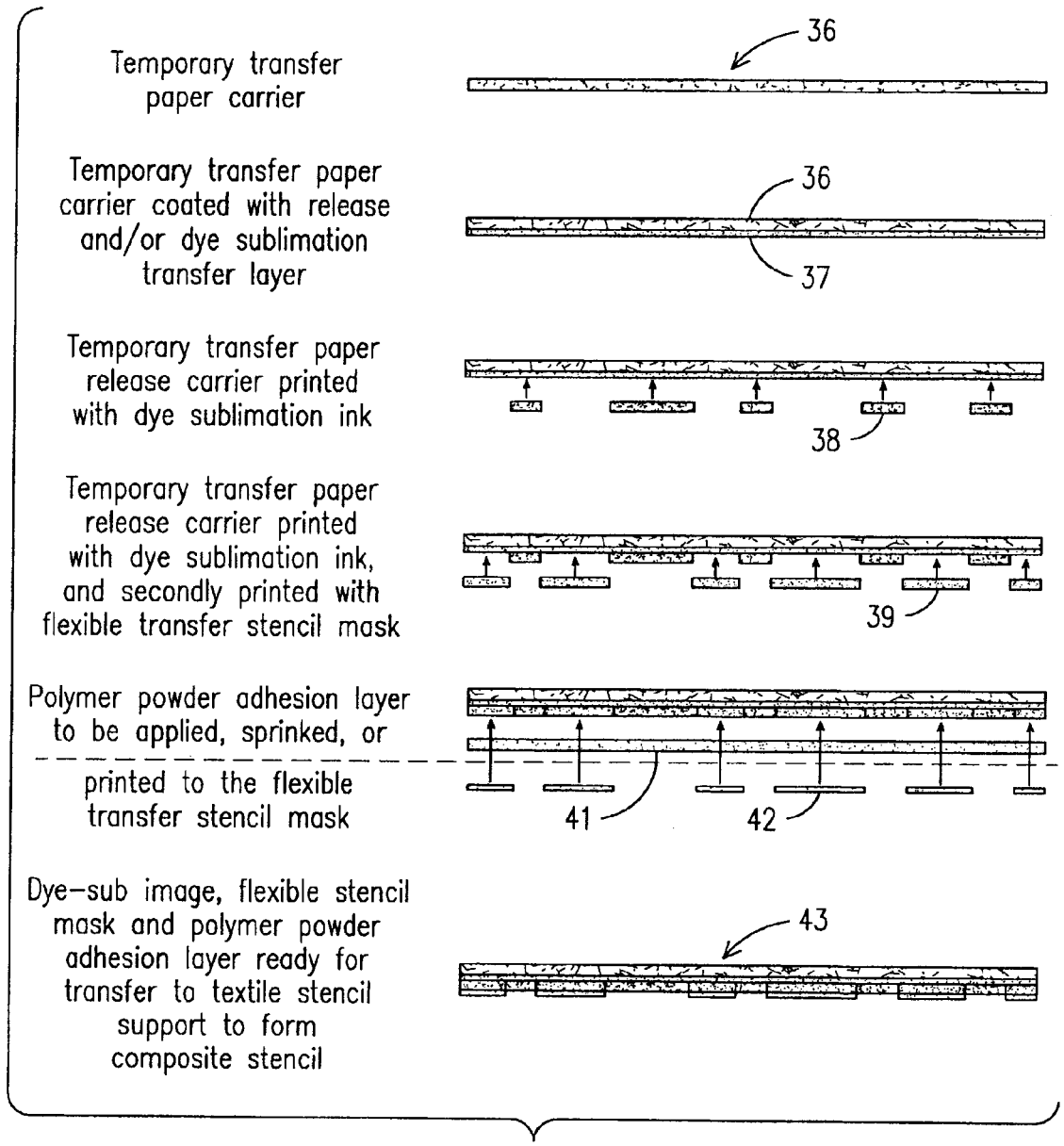
FIG. 6 illustrates a first process for applying a flexible transfer stencil mask and a dye sublimation transfer layer along with an adhesive powder to a temporary transfer paper carrier.

FIG. 6 illustrates one process for fabricating a temporary transfer sheet used to transfer a stencil mask to a stabilized textile support layer in the formation of composite stencils. The process proceeds from top to bottom in FIG. 6. A temporary transfer paper carrier is coated with a release layer 37, which also may serve as a dye sublimation transfer layer. Next, dye sublimation inks 38 may be applied in a pattern that corresponds generally to the open areas of the stencil mask. These inks will serve to dye the textile support layer in the open areas of the stencil to suggest color variations to a user during application of a design. The flexible polymer stencil mask material 39 is then applied in the areas of the stencil that are to be masked. Finally, an adhesion layer is applied to the polymer stencil mask to insure that the mask becomes fused and bonded to the textile support layer when the mask is applied thereto. The adhesion layer may be a polymer powder adhesion material 41 applied by spraying or sprinkling onto the stencil mask, or, alternatively, it may be printed onto the stencil mask as indicated at 42 using various known printing techniques. The adhesion material sticks to the exposed surface of the stencil mask material, which is still tacky or only partially cured. The completed transfer sheet is illustrated at the bottom of FIG. 6 with all layers applied as described. The stencil mask and sublimation inks, if used, are now ready to be applied to a stabilized textile support sheet in the fabrication of a composite stencil.

FIG. 7 illustrates an alternate technique for forming a temporary transfer sheet. Here, the temporary carrier is a filmic sheet 46, rather than the paper sheet of FIG. 6, to which a release layer 47, the stencil mask 48, and an adhesion layer is applied. Again, the adhesion layer may be sprayed or sprinkled onto the stencil mask as illustrated at 49, or it may be printed onto it as illustrated at 51. Because of the nature of the filmic sheet, it is not feasible to use dye sublimation inks with the embodiment of FIG. 7; however, it may be useful as a temporary transfer carrier where composite stencils are to be made without coloring the open areas of a stencil.

FIG. 8 illustrates yet another alternative technique for forming a transfer sheet for use in making composite stencils. In this alternative, the transfer carrier can be cleaned and reused after each use rather than discarded, making it a more efficient and eco-friendly alternative. Here, the transfer carrier comprises a PTFE coated glass fiber mat 56 (also 26 in FIG. 2). The glass fiber mat 56, 26 has interwoven elements 27 and 28 that are made of a glass fiber material. The mat is coated or impregnated with a PTFE coating 29 to render it more robust and to provide a reusable release surface to the carrier so that it may be used again and again. As with the filmic release carrier of FIG. 7, the stencil mask material 57 is applied to the PTFE coated transfer carrier 56 by an appropriate printing technique, whereupon a polymer adhesion layer is sprinkled (58) or printed (59) onto the stencil mask material for adhering the stencil mask material to the stabilized textile sheet when making composite stencils according to this disclosure.

FIG. 9 illustrates the process of stabilizing a textile support sheet prior to application of a stencil mask from one of the transfer sheets of FIGS. 6 through 8. The textile sheet in its native form is somewhat dimensionally unstable in that it can be stretched, skewed, and warped. This characteristic is unacceptable for a stencil, wherein the mask and open areas of the stencil must remain fixed with respect to one another. The textile sheet also is not very rigid in its native form, and this too is undesirable for a stencil. Accordingly, the textile support sheet 61 is treated with heat and pressure to form a stabilized support sheet 62. The application of heat and pressure bonds the elements of the support sheet together and partially melts and fuses portions of the sheet. This results in a somewhat thinner sheet, but one that is much more dimensionally stable and rigid than the original textile, and thus suitable for use as a textile support layer of a composite stencil.

Figure 10:
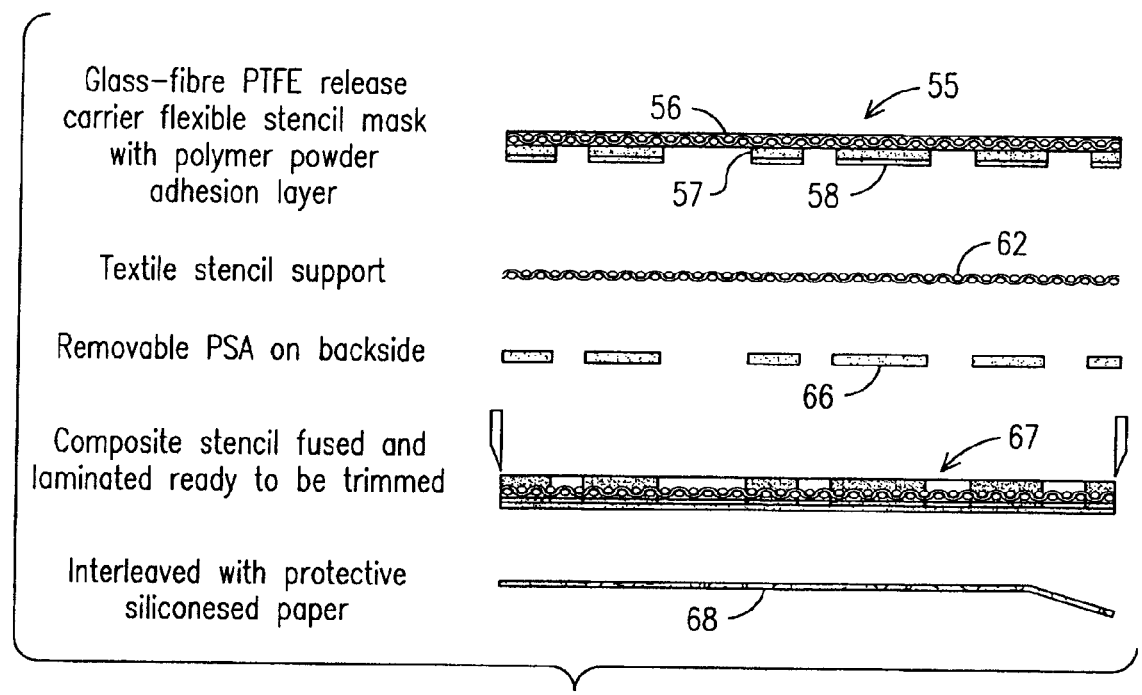
FIG. 10 illustrates the process of applying the flexible stencil mask to the textile support layer and also the pressure sensitive adhesive and release layer to the back side of the composite stencil.

FIG. 10 illustrates a preferred process for fabricating a composite stencil according to the invention. The transfer sheet 55 in this illustration is the reusable PTFE coated glass fiber sheet of FIG. 8 prepared with the stencil mask material 57 and adhesion coating 58. It will be understood, however, that this transfer sheet may be replaced with the temporary filmic transfer sheet of FIG. 7 or the temporary paper transfer sheet of FIG. 6. In fact, if it is desired to use dye sublimation inks to color open portions of the final composite stencil, the paper transfer sheet of FIG. 6 is the proper choice since such inks are not compatible with the filmic and PTFE coated carriers of FIGS. 7 and 8. Regardless of the transfer sheet selected, the transfer sheet 55 is applied to the stabilized textile support sheet 62 with heat and pressure. This causes the polymer adhesion layer to melt, fuse with, and seal the textile support sheet and also to form a permanent bond between the textile and the flexible stencil mask material. Furthermore, if a paper transfer sheet with dye sublimation inks is used, it also causes the dye sublimation inks to permeate and dye the textile support sheet in open areas of the stencil. As a result, the stencil mask is permanently bonded to the textile support sheet and the sheet is sealed in masked areas of the stencil. The pressure sensitive adhesive layer 66 is applied to the back side of the textile support sheet in a pattern corresponding to that of the stencil mask to form the composite stencil 67 (also shown in FIG. 4). The temporary transfer sheet is then removed to leave behind a composite stencil 67 (also shown in FIG. 1, where it is identified with the reference numeral 11). The composite stencil is then ready to be trimmed, whereupon a protective siliconized paper sheet 68 (also shown in FIG. 5) is applied to the back of the stencil to protect and preserve the pressure sensitive adhesive. The composite stencil is now complete and ready for use to apply designs to a wide array of surfaces as described above.

Figure 11:
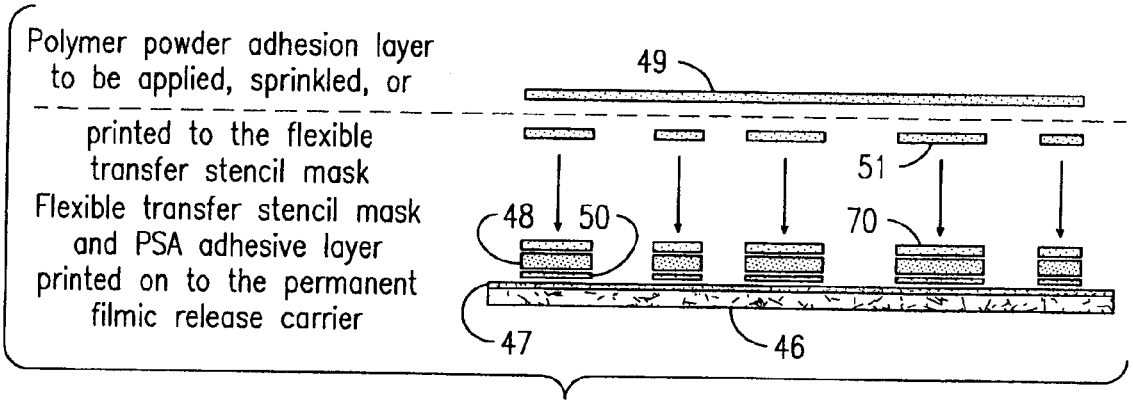
FIG. 11 illustrates another alternative method of making a release carrier wherein the release carrier becomes a permanent part of the stencil to protect the adhesive layer.

The inventions have been described thus far within the context of a temporary release carrier used to apply the stencil mask and perhaps inks to a textile support sheet. Another and significant approach is to form the stencil with a permanent release carrier that remains with the product as a removable and replaceable protective covering for the pressure sensitive adhesive of the stencil. FIGS. 11 and 12 illustrate one embodiment of this approach, and FIGS. 13 and 14 illustrate another.

Referring to FIG. 11, the permanent release carrier 46 in the form of a sheet is provided. For this application, the release carrier 46 preferable comprises a sheet of polyethylene terephthalate (PET), although other appropriate filmic materials may be used. The PET sheet is coated with a modified silicone release layer 47, which functions as a durable protective material. Next, pressure sensitive adhesive (PSA) 50 is printed or otherwise applied atop the release layer 47 in the pattern of the ultimate stencil mask. The stencil mask material 48 is then printed atop the PSA layer and in the same pattern. Finally, the polymer adhesion layer 70 for creating a bond between the mask and a textile sheet to be applied. The polymer adhesion layer may be applied by being printed onto the stencil mask as illustrated at 51 in FIG. 11, or alternatively may be applied as a sprinkled-on powder as indicated at 49. If a sprinkled powder is used, the powder sticks to the uncured stencil mask material 48 forming a layer on the masked areas of the stencil mask.

FIG. 12 illustrates the formation of the final stencil product using the permanent release carrier per FIG. 11. More specifically, the stabilized textile sheet 62 is laminated with, for example, heat and pressure, to the composite stencil carrier formed in FIG. 11. This causes the stencil material 48 to cure and also causes the polymer adhesion layer to melt and bond with the stabilized textile sheet, thus forming the stencil. The stencil may then be die-cut, as indicated by the blades in FIG. 12. In this embodiment of the stencil, the permanent release carrier comprising the modified silicone coated PET sheet 46 remains a part of the product. A user will pull off the PET protective film before using the stencil to decorate. After use, the composite stencil is placed back on the PET permanent carrier whereupon the PSA forms a releasable bond to the silicone coated sheet. The stencil can then be cleaned with water. Cleaning the stencil after placing it back on the release carrier provides the advantage that paint and water do not tend to seep or run onto the tack side of the composite stencil because it is protected by the permanent release carrier sheet applied thereto.

FIGS. 13 and 14 illustrate yet another embodiment of a method of forming a composite stencil with a permanent release carrier according to the invention. Here, the filmic (preferably PET) sheet 46 is coated with a modified silicone coating 47 as in the previous embodiment. Next, the pressure sensitive adhesive 50 is printed onto the coated release carrier in the shape of the stencil mask. The stabilized textile sheet is then laminated onto the PSA, which holds the textile sheet in place on the release carrier. Next, the stencil mask material 48 is printed directly atop the stabilized textile sheet in the shape of the stencil mask and polymer adhesive material 70 may optionally be printed or sprinkled atop the stencil mask material, although this is not required in this embodiment. The resulting laminate is then fused with heat and pressure to form the finished composite stencil as illustrated in FIG. 14. The stencil may then be appropriately trimmed as indicated by the blades in FIG. 14.

It should be noted that in the embodiments of any of FIGS. 11 through 14, the permanent filmic release carrier may be replaced with a temporary non-reusable release carrier made of paper or other appropriate material. This may be desired, when, for example, sublimation dyes are to be used to color open areas of the mask as discussed above.

Having described the composite stencil, its fabrication, and its use in general, a more detailed description will now be presented including specific examples and preferred formulations for various materials and elements of the stencil.

Referring again to FIG. 1, a strong flexible composite stencil is illustrated and is made out of first a film-forming water and solvent resistant transfer layer and a second layer of thermal forming polymer powder or/and formulated as a printable thermal polymer ink layer optionally including hot melt-tack particles laminated thereto. FIG. 3 shows a woven textile carrier receptor which is pressed, stabilized, and interlocked to form a interwoven stable fabric support to receive a transferable ink layer with the thermal forming polymer layer preset through the woven textile carrier to form a composite. In FIG. 4, an adhesive rear layer or backing is applied to adhere the stencil to a surface during decorating and is protected with a silicone coated paper or foil (FIG. 5). The film forming stencil mask layer may be screen-printed on to a release coated durable transfer sheet, which may be a film, paper support, or preferably a glass-fiber cloth PTFE coated temporary carrier. Although other printing techniques are possible, screen-printing is convenient because of the relatively thick film that must be applied.

After reproducing the printed design, the drying ink needs to be coated with a thermal forming polymer layer by means of sprinkling thermally reactive polymer powder particles onto the wet ink. Alternatively, the thermal forming polymer may be screen-printed n the form of a gelled ink, which can be formulated out of vinyl, polyester, polyurethane or acrylic binders. The ink preferably is between 100% solid and not less than 45% solids, to ensure the maximum thickness of the plastisol or organosol ink layer and the thermal polymer reactive adhesion layer. These layers should be fully cured or cross linked to insure maximum film-forming properties before heat lamination to the textile support layer. The thermal polymer adhesive layer can be formulated with hot-melt particles to obtain a certain amount of tack on the backside of the stencil textile after high pressure laminating.

The stencil textile support sheet or receptor (FIG. 3) needs to be stabilized and pressed at approximately its melting point to interlock its filaments and thereby create rigidity and structural integrity prior to receiving the plastisol or organosol printed transfer stencil masking layer. The stencil support sheet can be made out of woven textile consisting of nylon, polyester, polypropylene, or other material that can be thermally stabilized.

Another technique is to coat or print the textile support sheet with the thermoplastic polymer prior to direct printing of the thermal reactive film forming ink to the textile support layer. The polymer-fusing is applied directly and stabilizes the stencil to create a less costly composite stencil and is perfectly suitable for smaller stencils with the drawback of interference from the woven material during printing. After printing, the temperature fusion and cross-linking is carried out on the printed fabric.

If a color instruction image is desired on the composite stencil, polyester woven textile is preferred as the support layer and in this case the thermal fusing layer of the printed plastisol/organosol stencil transfer mask also consists of polyester thermoplastic polymer granulate to be coated or printed. In case of dye sublimation image instructions, the image is printed by means of offset printing onto a release carrier prior to screen printing the film-forming stencil mask onto the transfer carrier. The selected mask ink film-former and the stabilizing of the composite textile stencil receptor preferably is heated to a temperature above 215° C. The transfer application of the mask with the sublimable image instructions is only durable at a transfer temperature range of 190° C. to 210° C.

The transfer application of the printed stencil mask to the textile support sheet is done at high pressure and a minimum temperature of 180° C. It can be important that the thermal polymer adhesive be fully pressed through the textile filaments to close totally the open structure of the woven textile material. This is the process that will create the composite. After cooling down the polyester film, paper or glass fiber coated release carrier is pulled away, and if not incorporated, a pressure sensitive adhesive layer (FIG. 4) can be applied.

As shown in FIGS. 4 and 5, the pressure sensitive layer will keep the composite stencil in place on a surface during use for decoration and or printing, and should be protected by a coated release paper before and after use. The options for achieving the adhesive layer include integration of hot-melt granulate into the heat fusion transfer mask layer. A more controllable tack layer may be produced by printing a pressure sensitive adhesive using, for instance, a screen-printing technique. The selected adhesive needs to be water and solvent resistant and preferably activatable after cleaning with water when contaminated with dust, textile lint, or paper fiber from the decorated background. Less controllable coating techniques for the pressure sensitive adhesive may include curtain coating or spraying of an adhesive on to the backside of the composite stencil. These techniques may be suitable for certain purposes.

Examples of Reusable Transfer Carriers

There are numerous options for the reusable transfer carrier for the printed mask (see generally FIGS. 1-4). A first example is extruded films of polyethylene terephthalate (PET), or polybutylene terephthalate (PBT). For example, a bi-axially oriented film in a range of 50 to 100 micron thickness of PET, such as Mylar™, is coated with a mixture of polyvinyl alcohol ("PVA") and a chrome-fatty acid complex known as "Quilon™." To insure the adherence of the release coating, the PET film may be corona treated. A second example is the use of paper such as vegetable parchment varying from 40 to 80 grams per square meter and being sufficient for multiple use. The release coating is applied to this non-porous paper substrate and cured at approximately 130° C.

When a PET film is used as a permanent rather than a temporary transfer carrier, a modified silicone may be used as a release coating to insure that the PET film can be removed from the pressure sensitive adhesive and replaced. Another possibility is to coat the PET with a modified curable polysiloxane formula from General Electric. A composition particularly well suited for release coating applications is polysiloxane formulations containing effective amounts of .alpha.-olefins as modifiers. This option reduces the catalyst load of the compositions without affecting their performance as release coating compositions. Preferred diorganopolysiloxane base polymers are vinyl-chainstopped diorganopolysiloxanes. The curing reaction that takes place between the vinyl-functional polysiloxane base polymer and the SiH containing cross-linking agent is an additional cure reaction, also known as a hydrosilation. The compositions may be thermally cured between about 95° C. and 130° C. by means of a platinum catalysed cross linking reaction between the vinyl groups of the base polymer and the SiH reaction sites of the cross-linking.

The fourth example is of a reusable transfer carrier made from glass-fiber woven materials. Teflon (PTFE) is coated onto sheets of such material, or a continuing belt of the material may be coated depending on the preferred production method. The amorphous fluoropolymer coated material may be one of the most suitable coatings for this invention. The glass fibers create a durable and reusable transfer carrier. Suitable laminates of this type are offered by Norton Company, Wayne N.J. An alternative option option is to utilize a Teflon-coated Kapton polyamide in sheets or belts.

Example of a Dye Sublimation Dual Purpose Transfer Carrier

The dual sublimation dye transfer carrier may comprise any suitable sheet material, that is relatively non-porous and substantially impervious to the release layer and the dye bonding composition ingredients. For example, the dual sublimation dye transfer paper may comprise polyester film or paper. Other materials that may be used will occur to those skilled in the art.

In one method for dye transfer printing of a sublimable dye onto the stencil fabric with the film-formed transfer mask, heat and pressure are applied to the dye transfer carrier, which will readily accept the sublimation dye from the offset printed ink. This improvement comprises applying a composition (A) with a polyester resin having free carboxyl groups, a hardener and a dye binder which is a polymer of one or more monomers selected from the group consisting of unsaturated aliphatic hydrocarbons, acrylic acid esters, methacrylic acid esters, vinyl propionate, vinyl isobutyl ether, vinyl acetate, styrene and acrylonitrile. The transfer from the sublimation dye transfer carrier to the stencil fabric caises the polyester resin to bond the dye securely to the composite fabric stencil such that the dye will withstand numerous cleanings. The dual release coating is formed by using (B) PVA, Quilon, Polyethylene emulsions with the film-formed stencil mask image, the dye sublimation layer may be interposed between layers, causing the release agent layer or a part of it with the dye and the film-formed transfer mask to transfer onto the polyester composite stencil fabric.

Any sublimable dye known to those skilled in the art to bond effectively and satisfactorily to polyester may be used in practicing the invention. Preferred are disperse dyes, listed in the Color Index under the heading "Disperse Dyes." These dyes may include, for example, azo, anthraquinone, quinophthalone, nitro, azomethine, and styryl-type dyes.

Examples of Film-Forming Plastisol Stencil Masks

A non-volatile, fast-set, heat-radiation-dry plastisol or organosol vehicle for printing inks is preferred for the stencil mask material. Such materials generally include finely divided particles, a thermoplastic resin that solidifies at room temperature dispersed in a sufficient amount of compatible, reactive liquids, and or plasticizers to form a plastisol. After printing to the temporary transfer carrier, the plastisol is heated above the softening temperature of the resin mixture, which then swells, dissolves, and effectively absorbs the liquids such as plasticizers, monomers etc. to react cross-link and create the film-former. The resin may be pigmented to provide a contrasting color to present the graphic stencil image of the reproduced art to the stencil user. There are a number of liquids usable to create a printable paste substance.

Whereas it is usually preferable that the compositions covered by this invention contain little or no solvent and are, indeed, 100% non-volatile and thus extremely friendly to the environment, it is, of course, possible to reduce viscosity using normal organic solvents or water in which case it is usual to evaporate the solvents before the cross-linking operation takes place. In certain cases the solvents may still remain whilst the solubilizing of the polymer takes place where the type of remaining solvent can influence the suspension of the powder polymer. The solvent can also be water in certain cases where the cross-linking monomers and oligimers are for example are water dispersible.

In addition to a powdered polymer, the printing ink compositions of this invention may also include one or more non-reactive polymers that may be pre-dissolved in the liquid composition or in components of the liquid composition, such as in the polymerisable monomer(s) or oligimer(s). Suitable non-reactive polymers include acrylic.

Examples of Pigments and Dyes

The compositions can be pigmented or dyed by grinding pigments into the liquid plasticizers, monomers, or polymers, or by dissolving the dyes.

Plastisol or organosols generally refer to dispersions of fine-particle plastic powders in plasticisers and other liquids that harden or cure when heated to higher temperatures or by other initiation. Plastisols currently in use typically are composed of fine-particle polyvinyl chloride, polyvinyl chloride-vinyl acetate copolymers, and polyalkyl methacrylate such as polymethyl methacrylate copolymers, these are dispersed in plasticisers and other compatible liquids to form a printable paste. These pastes can be mixed with multi functional monomers, oligomers, and prepolymers capable of polymerization or copolymerization using the respective initiator systems to influence processing and application characteristics as desired.

There is development of new polyolefin-based plastisols or organosols and a method for their production. These plastisols or organosols can be chlorine-free, or contain a minimal amount of chlorine, which means that they off-gas or split off neither chlorine nor hydrogen chloride and are therefore are free from the disadvantages encountered in the production, processing, and disposal of polyvinyl chloride containing plastisols.

In general, polyolefin types that are commercially available in granular form are to be used for producing these plastisols or organosols. The production method ensures efficient fine-particle dispersion of the granular polyolefin in a dispersion medium so that the polyolefin is dissolved homogeneously in the dispersion medium in a very short time during the preparation of the plastisol in order to produce printing inks with excellent product properties at relatively high efficiency and with a low energy demand of the polymerisation process.

Dual Radiation Curing and Cross-Linking

The other component of the plastisols or organosols is a dispersion medium that consists of liquid monomers or monomers that melt at low temperatures. These monomers are capable of polyaddition and/or polymerizable or copolymerizable and/or oligomers and/or prepolymers. Optionally, liquids and plasticisers in dispersible or mixable portions may be used. The dispersion medium preferably is composed so that it does not dissolve the polyolefin at room temperature and causes little or no swelling of the fine-particles, but does dissolve the poly-olefin at temperatures exceeding its melting temperature and produces highly concentrated solutions or colloidal solutions of the polyolefin.

An initiator system is used for polymerization of the plastisol or organosol containing a dispersion medium composed of radically polymerizable and copolymerizable monomers and/or prepolymers and optional liquid plasticisers that consist of radical initiators such as common organic peroxides and/or suitable photo initiators. Examples are di-tert.-butyl peroxide, tert.-butylhydroperoxide, dicumyl peroxide, dilauryl peroxide, benzoyl peroxide, tert.-butyl perbenzoate and many other compatible combinations of epoxide compounds (monomers and/or oligomers and/or prepolymers) and allyl and/or vinyl and/or (meth)acrylate compounds and/or unsaturated polyester, vinyl ester, polyester acrylate resins and optional liquid softeners. An initiator system made of saturated and unsaturated acid anhydrides and free-radical initiators such as common organic peroxides and/or suitable photo initiators may be used for gelating the plastisol or organosol in a combined polyaddition, polymerization and copolymerization process. Photo initiators can be used as an initiator system either alone or in combination with the radical or ionic initiators mentioned above. Commercially available radical and ionic photo initiators are suitable, the plastisols or organosols according to this application can also be polymerised selectively in multiple layers.

The printed plastisol or organosol is cross-linked at temperatures ranging from 140° C. to 200° C. depending on the composition of the plastisol or organosol and plasticizers to obtain full polymerization. The applied print can be cured at a constant temperature over time or at increasing temperatures over time. If there are more layers of plastisol or organosol ink the first layers may be just slightly gelled at maximum 100° C. to 120° C. for inter-adhesion. This also prevents shrinkage of the transfer carriers. The required curing times are between 30 seconds to 3 minutes depending on the mass and heat absorption of the transfer carrier. The printed stencil mask can be heated using hot air, infrared radiation, high frequency radiation or the like.

If a dual cure method is selected, the plastisol is heated prior to ultraviolet exposure for homogeneous melting of the polyolefin particles when the plastisols of this example are polymerised using photo initiators. The preheated plastisol can also be polymerised selectively, layer by layer as long as the gelling temperature starts at about 80° C. and does not exceed about 120° C., total cross-linking can only start after all layers are applied, using subsequent hot air, infrared and ultraviolet radiation, electron beam, or ultraviolet laser beam irradiation.

Examples of Pressure Sensitive Adhesives for Composite Stencils

To keep the composite stencil in position during use and to prevent paint from running or seeping underneath the stencil mask contour, a pressure-sensitive adhesive is provided that is selectively removable from most surfaces and that retains that property for protracted periods of time, and is thus repositionable on surfaces. This result is achieved by preparing a pressure sensitive adhesive based on solvent solutions, cross-linking ultraviolet solutions, radiation curable or preferably a water based emulsion type, formulated from a number of tackifiers like copolymers of ethylene, acrylic ester, natural rubber, synthetic rubber, acrylate, and poly(vinyl acetate), poly(ethylene-co-vinyl acetate) copolymers. This tacky pressure-sensitive adhesive is modified with fillers, sphere particles and/or emulsified wax, surfactant or mixtures thereof present in a concentration to reduce adhesivity of the adhesive to a level sufficiently to allow removability and replacabilety, and to allow the adhesive to be cleaned with water and detergent to achieve tack-reactivation when tackiness is degraded by dust, textile lint, or paper fibers from decorated surfaces or otherwise.

The pressure-sensitive adhesive polymers used in the instant invention may be inherently tacky or tack may provided by the inclusion of a tackifier or plasticizer added during the formulating stage. Alternatively, the PSA layer may be formed by a controlled migration out of the plastisol or organosol printed layer before cross-linking to activate the tack of the PSA layer, which is non or low tack before being in contact with the printed mask. The filler, sphere's, and wax and/or surfactant are provided during the preparation stage and cast as part of a homogenous emulsion to provide a pressure-sensitive adhesive coating at any desired uniform level of removability, as compared to the unmodified pressure-sensitive adhesive composition. This is in consequence of a reduction in adhesion level. Cross-linking is only required to a partial level and the adhesive will remain water sensitive. It is preferred to use either the filler, sphere's and wax alone or the filler, sphere's, and surfactant alone.

Emulsifiable wax can be employed in the amount of about 0.5 to about 8% by weight of the emulsion polymer and wax. A surfactant can be employed in the amount of about 0.5 to about 3.5% by weight of the acrylic emulsion polymer and surfactant. When used in combination the total amount of wax and surfactant present should be less than about 5% by weight of the emulsion polymer and additive wax and surfactant.

Wax reduces dramatically the adhesion level. Wax emulsions include emulsified petroleum resins, paraffin waxes, oxidized paraffin waxes, microcrystalline waxes, carnauba waxes, montain waxes, polyethylene waxes and the like emulsified to form a nonionic wax emulsion.

The pressure sensitive adhesive composition may be applied by spraying, curtain coating, or preferably by screen printing in dissolved or dispersion form, so that after thermal drying the layer results in an adhesive film having a thickness of preferably from 15 to 40 m included the sphere's particle size.

Suitable adhesive products such as ethylene, vinyl acetate, acrylate emulsion are marketed, by Air Products Polymers, Burghausen, Germany as dispersions, they prove to be suitable ingredients for pressure sensitive adhesives fore this application. The preferred composition, for the pressure sensitive adhesive composition has the following formulation: ethylene from 5 to 30, with particular preference from 10 to 15% by weight, vinyl from 15 to 50, with particular preference from 30 to 35% by acetate weight, acrylic from 30 to 70, with particular preference from 50 to 60% by ester weight, acrylamide from 0 to 8, with particular preference 0.5% by weight.

Pattern Printing of Pressure Sensitive Adhesives

U.S. Pat. No. 6,541,561 discloses a technique for applying an adhesive in a pattern shape in which the adhesive is printed and can be varied in size and structure and by selecting the coarseness of the mesh screen. These patterns can be uniform over the whole area of the mesh or they can be restricted to particular areas, which is the case for stencils. It is important that the composite stencil of the present invention whilst being firmly held on to a surface to be decorated, is subsequently removable and repositionable. It has been found that by printing the adhesive with thicker peaks in selected areas, the stencil is adhered more on the peaks and less between the peaks, making the stencil easily removable and repositionable.

It is also possible by subsequent flow time or by heating, to induce the further flow of adhesive to entirely eliminate the areas of low coating weight, and minimize the problem of printing under and over the backside of the composite stencil uneven surface and obtain a perfectly uniform adhesive layer after printing if desired.

These adhesive pattern surfaces give improved adhesion over uneven surfaces like wood-grain, paint and wall paper, furthermore by selecting the dot sizes and shape the adhesive surface area can be adjusted to ease removability not only by the modified tack level but also by the surface area.

It is also possible to print the adhesive in patterns indirectly by first printing the adhesive on a release surface, for example, a protective silicone release paper or PET film.

One of the benefits of this method is that there is a strong attachment of the silicone paper or PET film composite stencil, even if the adhesive is relatively low in tack, and the silicone paper or substrate is not easily detached during packaging if the silicone paper is not securely bonded, and comes away in the insertion process.

Where the pattern printing is uniform, no registration may be required, but it would be possible to align sheets to include the possibility of registering non-uniform adhesive patterns requiring some degree of registration of the adhesive to the composite stencil, it is found that if the dot size or pattern shape is finer than the textile filament all over coating an laminating is not obstructing the open parts of the composite stencil.

The innovative way of using the pattern pressure sensitive adhesive is selecting the pattern shape and size that during the application to the decorating surfaces no air-entrapment occurs and by selecting the dot size the adhesive still can have a sufficient tack level but reposition and removability is optimal for the user/decorator. It is found for this use that a 30 to 45% dot size and the equivalent of 80 to 120 lines per inch is offering the best PSA structure.

After or before the application of the pressure sensitive adhesive the composite stencil is protected, printed, coated or laminated with a commercial release coated paper selected from a paper weight and strength to allow prolonged use, preferable when coated or printed prior to laminating with a double side (PE) extruded one side silicone coated paper.

Laminating the Printed Film-Forming Stencil Masks

A method is described of heat and pressure transfer laminating onto the receptor textile cloth substrate. As discussed, the cloth will have been pressed under heat to stabilize the fibers, which become interlocked for rigidity and stability. The polyester is pre-shrunk prior the actual transfer process. The printed transfer mask is formed on a carrier, paper, film or glass fiber Teflon coated sheet or belt as described above. The polymeric adhesive and, optionally, the sublimable dye image, is fused with the textile substrate by heat and pressure to create the composite stencil, wherein the polymeric adhesive and barrier covers the transfer mask. A method of immolating the stencil textile composite receptor relates to a transfer method comprising a reusable flexible carrier printed with a complex of drying inks. A heat transfer press, comprising a support, a lower plate support, an upper plate on said support heated thermostatic temperature controlled, an air conduit attached to air lift cylinders to act and react said cylinders in uni-son, the upper plate having moving means associated with said support comprising an upper plate body provided with a Teflon coating, this heated plate having a number of chambers, and a plurality of radiant heating elements fastened respectively, timing means, pressure and temperature for actuating the upper plate, the transfer carrier with the transfer mask and the pre established textile stencil receptor are placed on the lower plate to a second position wherein the lower and upper plates are controllable pressed to the temporary transfer carrier supporting the instructive image with the transfer mask and the polymeric adhesive, heat is transferred to the polyester cloth, and will be softened to receive the vaporized sublimable dye and/or the transfer mask to form the composite stencil permanently after the desired pressure, temperature and time, the upper plate being moved upwardly by the air lift cylinders, after cooling, the temporary carrier can peeled away and be reused.

Color yield and definition of the coloration processes for the textile stencil support, more especially of sublimable dyes applied by transfer printing, requires higher transfer pressure and temperature and it is preferred to separately transfer the printed sublimable dye on to the composite stencil the improvement is considerable and resistance to cleaning is improved.

Pressure Sensitive Adhesive Formulations

Formula 1—Low-Tack:

|  | Parts by Weight |
| --- | --- |
| water | 100.0 |
| ammonium/sodium polyacrylate thickener 15-18% solids | 10.0 |
| silica/fumed silica | 3.0 |
| glycerol monostearat dispersion | 40.0 |
| ammonia solution | 0.2 |
| polyvinyl methyl ether dispersion 55% solids | 5.0 |
| 2-ethyl hexylarylate/vinyl acetate dispersion 55% solids containing 30 50% 2-ethyl hexylacrylate | 15.0 |
| 2-ethyl hexyl arylate/vinyl acetate dispersion 55% solids containing 75% 2-ethyl hexylacrylate | 35.0 |

The adhesive composition may be widely varied in respect of high and low tack adhesive levels, drying is to be carried out by air-knives and temperature to fully evaporate water. If printing is the selected method, mesh count from 165 to 280 per inch are to be considered, the mesh is selected according to the required coating weight, dot size, and the pattern surface.

The rheological approach is to design a gel to help printing the dots and patterns the aqueous medium as a dispersion medium for the above-described composite particles is usually water, but in some cases it is also possible to use a mixed solvent of water with a water miscible organic solvent.

Formula 2—Medium-Tack:

|  | Parts by Weight |
| --- | --- |
| terpene resin (melting point 80-1200 C.) prepared in the form of a 50% emulsion | 37.3 |
| polyvinyl butyl ether in the form of a 60% emulsion | 37.3 |
| silica/fumed silica 2.0 copolymer of butyl acrylate and | 11.5 |

-continued

| | Parts by Weight |
|---|---|
| methyl acrylic in the form of a 50% emulsion | |
| methyl cellulose in 10% water solution 12.5 water soluble flow agent | 0.8 |

The adhesive composition may be widely varied in respect of high and low tack adhesive levels.

Formula 3—High-Tack:

| | Parts by Weight |
|---|---|
| water | 20.0 |
| ethylene, vinyl acetate, acrylate in the form of a 50% emulsion | 37.3 |
| aerogel silica 10-12 millimicron | 2.0 |
| aliphatic hydrocarbon solvent | 4.5 |
| polyethylene wax emulsion in water | 10.5 |

The wax content of this adhesive formulation may be widely varied in respect of repositionability.

Plastisol/Organosol Film Forming Formulations

Formula 1—Plastisol Transfer Ink:

| | Parts by Weight |
|---|---|
| vinyl chloride homopolymer | 65.0 |
| epoxy plasticizer | 30.0 |
| tin based stabilizer | 2.0 |
| alifatic hydro carbon | 2.5 |

Pigment and or dye can be added to color the mask, depending on the oil absorbing of the pigment the above formulation needs to be modified for plasticizer levels.

Formula 2—UV Plastisol Dual Cure:

| | Parts by Weight |
|---|---|
| vinyl chloride acetate copolymer | 25.0 |
| polyester acrylate oligomer | 35.0 |
| tripropylene glycol diacrylate | 15.0 |
| epoxy plasticizer | 10.0 |
| bezophenone photoinitiator | 4.0 |
| benzildimethyketal photoinitiator | 1.0 |

Pigment and or dye can be added to color the mask, depending on the oil absorbing of the pigment the above formulation needs to be modified for plasticizer levels.

The invention has been described herein in terms of preferred embodiments and methodologies considered to represent the best modes of carrying out the invention. It will be clear to skilled artisans, however, that a wide variety of additions, deletions, and modifications might well be made to the illustrative embodiments without departing from the spirit and scope of the invention as set forth in the claims.

What is claimed is:

1. A method of making a composite stencil for applying paint to a surface in decorative patterns, the method comprising the steps of:
providing a sheet of support material having first and second sides and configured to allow paint to pass therethrough;
applying a stencil mask material to one surface of a transfer carrier in a pattern defining masked areas and open areas, the transfer carrier comprising a glass-fiber PTFE coated transfer carrier;
after applying the stencil mask material to one surface of the transfer carrier, applying the transfer carrier and stencil mask material to the first side of the sheet of support material such that the stencil mask material bonds with the support material to form a stencil mask;
applying a releasable adhesive to the second side of the support material; and
after applying the releasable adhesive to the second side of the support material, applying a selectively removable sheet of protective material to the second side of the support material covering and protecting the releasable adhesive.

2. The method of claim 1 wherein the support material is a woven material.

3. The method of claim 2 wherein the woven material comprises woven together intersecting textile elements.

4. The method of claim 3 and further comprising exposing the sheet of support material to heat and pressure to fuse the woven together intersecting textile elements at their intersections.

5. The method of claim 1 and wherein the transfer carrier is a temporary transfer carrier.

6. The method of claim 5 and wherein the temporary transfer carrier comprises a paper carrier.

7. The method of claim 5 and wherein the temporary transfer carrier comprises PET.

8. The method of claim 1 and wherein the transfer carrier is a reusable transfer carrier.

9. The method of claim 1 and further comprising exposing the transfer carrier with stencil mask and the sheet of support material to heat and pressure.

10. The method of claim 9 and further comprising applying a layer of thermal adhesion material to the stencil mask to bond the mask to the support material when exposed to heat and pressure.

11. The method of claim 1 and further comprising applying a layer of thermal adhesion material to the stencil mask to bond the mask to the support material.

12. The method of claim 1 and further comprising the step of dying the support material in selected portions of the open areas.

13. The method of claim 12 and wherein the selected portions of the open areas are dyed colors that suggests colors to be applied by a user when decorating with the composite stencil.

14. A method of making a composite stencil comprising the steps of:
(a) supplying a filmic release carrier;
(b) applying a coating of pressure sensitive adhesive to a side of the release carrier, wherein the carrier is a transfer carrier comprising a glass-fiber PTFE coated transfer carrier;
(c) applying a stencil mask to the pressure sensitive adhesive in a pattern that defines masked areas and open areas;
(d) applying an adhesion layer to the surface of the stencil mask; and
(e) fusing a textile support sheet to the adhesion layer.

* * * * *